Figure 1:
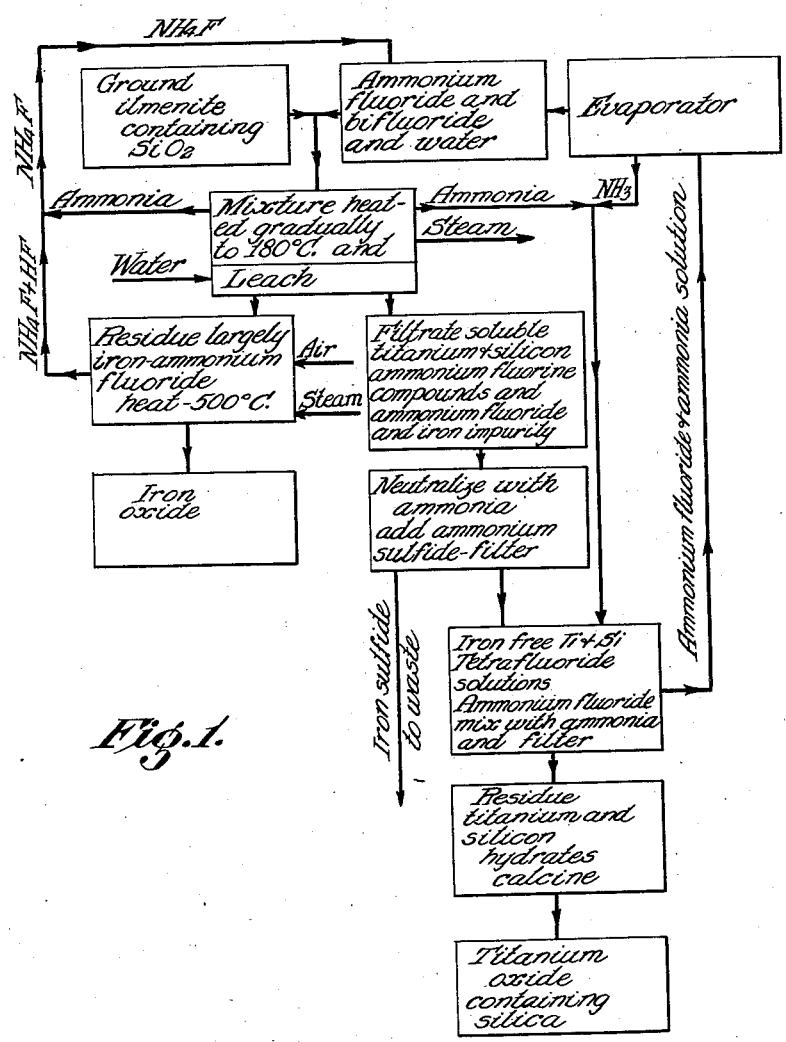
Figure 2:
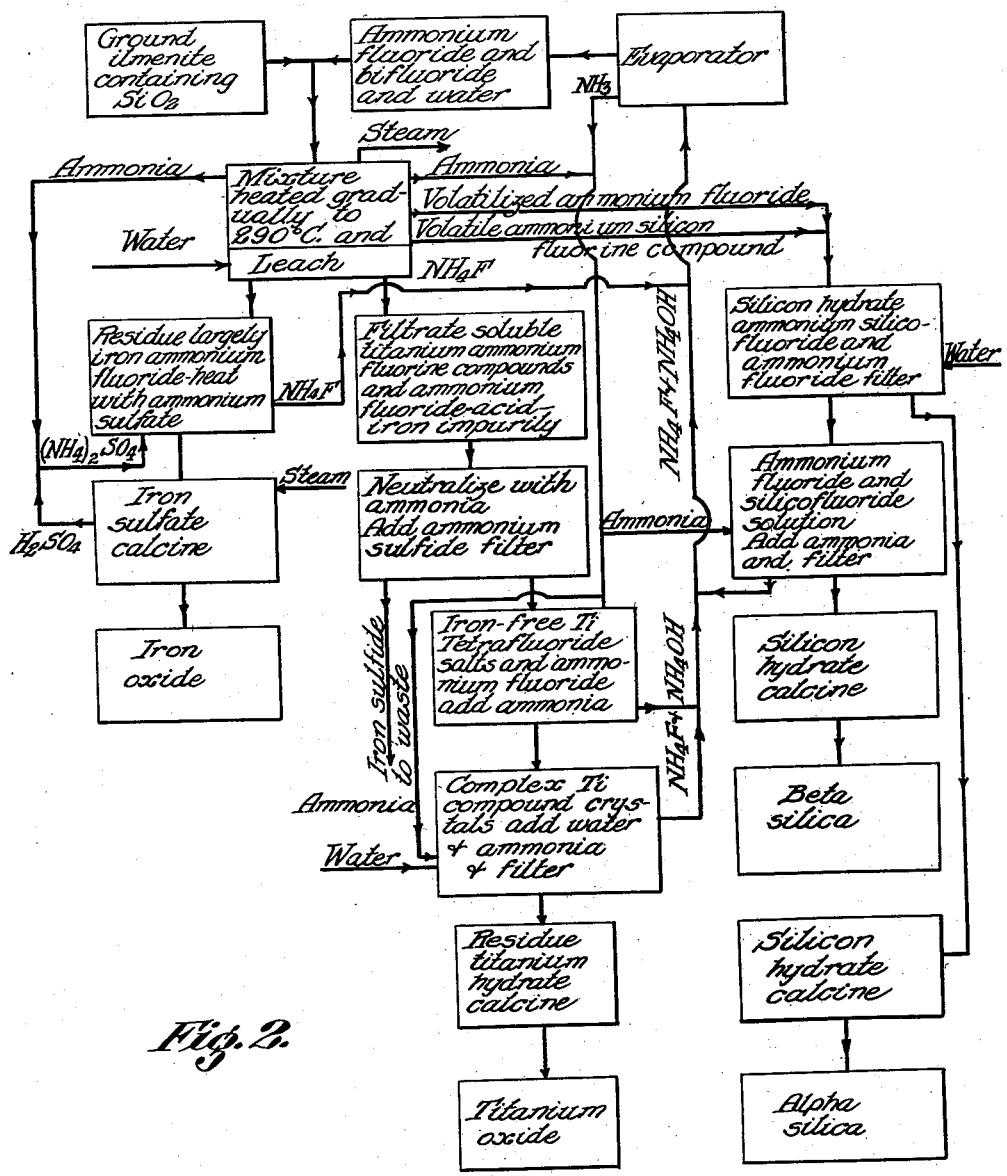

May 26, 1936.  S. S. SVENDSEN  2,042,435
TREATMENT OF TITANIUM BEARING MATERIALS
Filed Sept. 27, 1934  2 Sheets—Sheet 1

May 26, 1936.    S. S. SVENDSEN    2,042,435
TREATMENT OF TITANIUM BEARING MATERIALS
Filed Sept. 27, 1934    2 Sheets-Sheet 2

Inventor
Svend S. Svendsen
by
Pennie, Davis, Marvin & Edmonds
Attorneys

Patented May 26, 1936

2,042,435

UNITED STATES PATENT OFFICE 2,042,435

TREATMENT OF TITANIUM-BEARING MATERIALS

Svend S. Svendsen, Madison, Wis., assignor, by mesne assignments, to Burgess Titanium Company, a corporation of Delaware Application September 27, 1934, Serial No. 745,753

45 Claims. (Cl. 23—202)

This invention relates to improvements in the production of titanium oxide from titanium-containing materials, particularly titanium oxide minerals or compounds such as ilmenite and rutile, by processes wherein the titanium of such compounds is converted into tetrafluoride compounds, as more fully hereinafter set forth. This invention relates in part to improvements in the processes described and claimed in my copending application Serial No. 614,043, filed May 27, 1932, of which this application is a continuation in part.

In the process of the present invention, the titanium content of the ore is secured in the form of fluoride compounds soluble in aqueous liquids, particularly of a non-alkaline character, the compounds being such that the titanium may be readily separated from their solutions in highly purified form, either as hydrates or as compounds readily convertible into hydrates. The hydrates thus secured are of high purity and of a character such that they are readily adaptable to the production of pigments or other material wherein freedom from extraneous compounds is essential.

In the production of the soluble fluoride compounds from the titanium-bearing materials or ores, their formation and solution may be effected simultaneously, the resulting solution being separated from the residue; or soluble fluoride compounds may be formed by reaction of the titanium ore and subsequently dissolved and removed therefrom by a suitable solvent; or the soluble fluoride compounds may be formed and removed from the remaining constituents of the ore by volatilization for subsequent solution. In each case the soluble compounds formed are tetrafluoride compounds of ammonia and titanium and the resulting solutions have similar characteristics. However, with each variation of the procedure in accordance with the invention, the specific chemical composition and physical character of the soluble tetrafluoride compound formed may vary, each having certain advantages under different industrial and operating conditions.

Silicon which may be present is likewise susceptible to conversion to fluoride compounds, but as the silicon and titanium fluoride compounds are dissimilar in certain physical as well as chemical characteristics, they may be separated readily. For example, silicon tetrafluoride is a gas at room temperatures whereas titanium tetrafluoride boils at a temperature of about 290° C. The vaporization temperatures of the diammino-tetrafluorides of silicon and of tatanium are about 100° C. apart. Silicon tetrafluoride and its amino compound are decomposed by water, part of the silicon being thereby precipitated as the hydrate. All of the silicon is completely precipitated by the addition of a stoichiometrically equivalent amount of ammonia. In comparison the corresponding titanium compounds are water-soluble without decomposition under ordinary conditions and the titania may be precipitated completely therefrom on the addition of an excess of ammonia.

In operating in accordance with the present invention, the conversion of the titanium content of the titanium-containing material, such as titanium oxide ore, into the desired tetra-fluoride compound is effected by subjecting it to the action of a reactive fluoride compound, preferably an ammonium fluoride, suitably after fine grinding and under conditions as hereinafter set forth. The reaction of the reactive ammonium fluoride compound on the titanium material in accordance with the present invention results in the formation of certain titanium-ammonium fluoride compounds. These may be either water-soluble primary compounds or more complex compounds, depending upon the conditions obtaining during reaction.

In carrying out the present invention, I have found it desirable to add ammonium fluoride to the titanium oxide compound in excess of the quantity theoretically required by stoichiometrical calculation for the complete conversion of the material into simple fluorides to secure a high yield of the primary compound referred to. For instance, for one molecule of titanium oxide ($TiO_2$), 4 molecules of ammonium fluoride are required stoichiometrically as shown in Equation (1) but I prefer to employ at least 6 molecules of ammonium fluoride and in general considerably more:

(1) $TiO_2 + 4NH_4F = TiF_4 + 2H_2O + 4NH_3$ 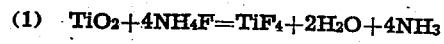

The reaction may be carried out in the presence of water and with a large excess of ammonium fluoride, in which case an ammonium-titanium-fluorine compound, which may be a double fluoride of titanium and ammonium or possibly a titanofluoride, is formed. While less of the fluoride may be used, the large excess of fluoride is desirable in order to secure complete reaction. Thus, if only stoichiometric proportions are used, a part of the oxide remains unattacked. The exact composition of the double fluoride is in doubt.

If the reaction is carried out in the dry way, that is, if substantially dry ammonium fluoride is mixed with a ground titanium oxide and heated to the reaction temperature, suitably below 150–200° C. and usually at 75–150° C., or at a temperature of 110° and higher so that the presence of liquid water is substantially or completely prevented, the reaction products are different in composition in that the ammonia formed unites with the double fluoride of titanium and ammonia to form a vaporizable complex ammino compound. When 6 or more molecular parts of ammonium fluoride are used the reaction (in the dry way) appears to be about as follows:

(2) $TiO_2 + 6NH_4F = TiF_4.xNH_3.yNH_4F + 2H_2O + (4-x)NH_3 + (2-y)NH_4F$

The reactions in both the wet and dry way are more readily carried out when ilmenite is used than when rutile is used. Possibly the iron oxide in the ilmenite or the iron fluoride formed by the reaction acts in some way to facilitate the reaction. Certain aspects of the reaction in the dry way are set forth and claimed in my prior application Serial No. 614,043.

The complex titanium-tetrafluoride compound formed in accordance with Equation (2) at reaction temperature below 150°–200° C., is not decomposed by water vapors at a temperature substantially below its vaporization temperature. It provides a ready means for separation of titanium from a reaction mixture, for example, by vaporization, in which case there is accompanying dissociation. On heating to above 150°–200° C. dissociation starts and some of the ammonium fluoride is driven from the complex titanium salt. However, this dissociation of the ammonium fluoride from the complex compound is not complete until the complex compound vaporizes, such vaporization starting at about 290°–300° C. On dissociation of the complex compound, the titanium is in the form of vapors of titanium tetrafluoride compounds, principally of the diammino-fluoride tetrafluoride $TiF_4.2NH_3$, and these compounds may be dissolved for further treatment as hereinafter described.

The complex compound derived as in Equation (2) is soluble in water and also in a neutral or acid ammonium fluoride solution. A leaching process similar to that described hereinafter in connection with the wet process, may therefore be used in lieu of the vaporization process for removing the titanium from the reaction mass. When ammonium fluoride solution is used for leaching, it is preferably of the concentrations hereinafter specified, since the solubility of ferrous fluoride, which may be present, varies inversely with the concentration of the ammonium fluoride, being many times more soluble in water than in a 20% $NH_4F$ solution. An adequate excess quantity of ammonium fluoride is desirable.

When the reaction is carried out in the dry way and ammonium fluoride is added to the titanium oxide compound in stoichiometric proportions according to Equation (1), there is a shortage of reactive fluoride caused by formation of the complex titanium tetrafluoride compound of Equation (2) wherein $x$ and $y$ are each at least 2. Some ammonium fluoride may be volatilized before it reacts with the titanium-containing material if the stoichiometric proportion is initially supplied in accordance with Equation (1) or (2) and this volatilization loss also makes advisable the use of additional excess fluoride. Furthermore, in the primary decomposition reaction, metallic oxides other than titanium may also react with the ammonium fluoride, as for example, the iron oxide in ilmenite. The iron oxide reacts to form iron fluoride which combines to form a double salt with excess ammonium fluoride, 4 molecules of ammonium fluoride being theoretically necessary in the reaction for each molecule of iron oxide figured as FeO. The complete reaction with ilmenite is probably as shown by the following equation (in the dry way):

(3) $TiO_2.FeO + 10NH_4F = TiF_4.xNH_3.yNH_4 + FeF_2.2NH_4F + 3H_2O + (6-x)NH_3 + (2-y)NH_4F$ ($x$ and $y$ probably being 2 or more). The composition of ilmenite given above is merely illustrative as the ratio of iron oxide to titanium oxide varies considerably.

Preferably, substantially more than 10 molecular parts of the ammonium fluoride are used in reaction with ilmenite because a portion of the ammonium fluoride vaporizes during the course of the reaction, especially if the temperature is above 150° C. Above this temperature the ammonium fluoride has an appreciable vapor pressure. It melts and boils at about 200° C. or slightly thereabove. Excess fluoride is not detrimental to the reaction. If caking of the charge occurs in the furnace this may be prevented by mixing an inert material with it. A convenient inert material is the residual iron fluoride produced or finely ground fluorspar.

The finely ground titanium-containing material and excess of ammonium fluoride are mixed thoroughly and heated, suitably in an iron container and preferably with constant stirring to prevent local overheating and to secure more rapid reaction. When ilmenite is used there may be some reaction at room temperature but the temperature is raised to above 75° C. and preferably above 100° C.–110° C. to complete the primary decomposition reaction quickly and efficiently. Although the temperature of the reaction mass may be raised to 290° C.–300° C. for the primary reaction it preferably is kept below about 220° C. and usually at about 150° C. at which temperature the reaction is vigorous. When ilmenite is used there is some tendency to fuse if the temperature of the reaction mass is allowed to go above 140° to 150° C. during the early stages of the reaction. At later stages, the temperature employed may be higher.

Rutile does not react appreciably with ammonium fluoride under about 140° C. but the reaction is vigorous at about 170° C. The reaction between rutile and ammonium fluoride at above 140° C. causes fusion to occur and the charge becomes of a pasty or semi-fluid consistency. The small amount of iron present as an impurity in rutile is insufficient to prevent fusion of the reaction mass.

In carrying out the reaction, if the reaction mass is kept above 110° C. the water generated by the reaction is not condensed nor retained in the charge, but is driven off as a vapor. The reaction under these conditions takes place in what I designate as a substantially "dry state"; that is, in the absence of liquid water.

The ammonium fluoride and titanium-bearing material may be supplied in the reaction in a variety of ways to secure the best results with the specific ore employed. They may be mixed, and the mixture may be fed into the reaction chamber at one time or over a limited period of time. Or if desired, one-half of the fluoride may be mixed with all of the titanium-bearing material and this mixture charged into the furnace as described. After this charge has reacted the balance of the ammonium fluoride is added over a period of time to the heated charge while stirring. Varying temperatures may be employed; for example, as previously mentioned, higher reaction temperatures are required for rutile than for ilmenite. In another variation the ore and fluoride are thoroughly mixed cold, briquetted and then heated in the reaction chamber, thereby minimizing the dusting which may occur as a result of the evolution of vapors during reaction, for example, of the titanium tetrafluoride compounds at above 290°–300° C. Thorough mixing of the fluoride and ore, as by grinding in a ball mill or edge runner, is conducive to complete reaction between the materials. The reaction mixture may also be prepared by adding the ammonium fluoride to the finely ground ore in the form of a concentrated aqueous solution. The water is then driven off and an intimate mixture of the ore and ammonium fluoride is obtained. This mixture is then heated as above set forth.

In carrying out the dry way process, the reaction mixture of, for example, ilmenite and ammonium fluoride may be held at a reaction temperature below about 150° C. until ammonia practically ceases to be evolved. The reaction mass becomes a white or grayish white powder. The titanium compounds may then be separated by solution or leaching, or by volatilization. These separation methods also apply to the wet reaction process described hereinafter. In either case it may be desirable to preliminarily remove other volatilizable compounds, such as ammonium fluoride or silicon compounds. Thus the temperature may be raised and the volatile materials driven from the reaction mass. As the heat is applied and the temperature is raised, excess ammonium fluoride and also a part of the ammonium fluoride compound formed at the lower temperature are volatilized. The higher temperature also tends to complete the reaction with any titanium-bearing material which may not have been reacted upon previously. As the temperature is raised above 230° C., silica present is volatilized as silicon diammino tetrafluoride, this compound being substantially entirely volatilized below 290° C. It may be condensed with the volatilized ammonium fluoride. Although the temperature of the reaction mass may be kept below 300° C. and above 150–200° C. for a period of time in order to volatilize as much ammonium fluoride as possible for separate recovery thereof, it usually is desirable to cut the operating time by raising the temperature as rapidly as possible from 150° C. to above 300° C.

The titanium may be then separated from the reaction mass by volatilization or by solution or leaching. For the volatilization of the titanium tetrafluoride compound formed by the partial decomposition of the original complex compound at above about 150°–200° C., a temperature in excess of 290°–300° C. is required, 350°–400° C. usually being sufficient. The complex titanium tetrafluoride compound is largely dissociated with respect to the ammonium fluoride and vaporized as ammonium fluoride and titanium tetrafluoride compounds, principally ammino compounds such as titanium diamino tetrafluoride ($TiF_4.2NH_3$). The $FeF_2.2NH_4F$ also dissociates, ammonium fluoride volatilizing and leaving the iron fluoride. Thus, after the temperature of the reaction mass passes 300° C. there is an evolution of the diammino compound and possibly other tetrafluoride compounds. The temperature usually is increased to a maximum of about 550° C., although higher temperatures may be used.

I may use, as the reactive fluoride, either ammonium fluoride or ammonium bifluoride or a reaction mixture capable of producing such fluoride compounds such as a mixture of ammonium sulfate with a metallic fluoride such as fluorspar. Such a mixture of fluorspar and ammonium sulfate may be used especially in the volatilization process, since these materials do not react to form ammonium fluoride until a temperature of about 300° C. is reached. In general, I prefer to use ammonium fluoride, and I prefer the normal salt over the acid salt.

The reaction residue, after removal of the titanium compounds by volatilization at 350°–400° C., contains metallic fluorides, such as fluorides of iron, aluminum and the like, and may contain some unvolatilized titanium fluoride compounds such as ammonium titano-fluoride, titanium oxyfluoride and the like. When these are heated to the higher temperatures, for example, 500° C. or higher, further dissociation and/or volatilization of these compounds may occur and thereby further recovery of volatilizable fluoride compounds effected. Ammonium titano-fluoride $(NH_4)_2TiF_6$, which may be formed in the various reactions, volatilizes undecomposed at such higher temperatures. Removal of the fluoride content of the residue may be effected also by heating the final residue in an atmosphere of water vapor and ammonia (such as that formed in the primary reaction) or of water vapor alone but preferably in the presence of oxygen or air, thereby forming metallic oxides and ammonium fluoride or hydrofluoric acid respectively; or a reactive sulfate, such as ammonium sulfate, may be admixed therewith and the mixture heated to about 300° to 350° C. The titanium ores available usually contain considerable iron. This reaction produces ammonium fluoride which passes off as a vapor, ferrous sulfate and other metallic sulfates, probably as in reaction (4) infra. The ferrous sulfate may be decomposed in the usual way by roasting in the presence of steam to form sulfuric acid and iron oxide. If any non-volatile titanium fluoride compound is present in the reaction residue, it likewise is decomposed by the ammonium sulfate under these conditions, the titanium being at least in part vaporized as an amminotetrafluoride.

(4) 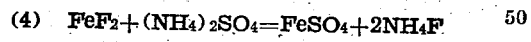

The ammonium fluoride produced in the sulfate reaction may be employed in the process as hereinafter described more in detail. Losses of ammonium fluoride which occur in the process may be made up by adding the desired amount of a mixture of fluorspar and ammonium sulfate, or of other reaction mixture capable of forming ammonium fluoride, to the reaction residue during its decomposition by ammonium sulfate.

The volatilized compounds formed during the operations described and which comprise titanium diamminotetrafluoride, ammonium fluoride, ammonium titano-fluoride and other compounds, may be condensed and collected for treatment or they may be subjected while in vapor form to a treatment which effects solution of the titanium compounds or which directly precipitates the titanium as hydrate. Such precipitation may be effected by reacting upon the titanium compounds, either in vapor form or after condensation as a solid, with water and ammonia. The ammonia should be used in excess. The hydrated titania is denser if an ammoniacal solution of concentrated ammonium fluoride is used for the reaction, and especially if this solution is cold (below 34° C. and preferably below 10° C.) when it contacts with the titaniumtetrafluoride compounds. As set forth hereinafter, under certain conditions of concentration a crystalline salt of titanium instead of the hydrate forms.

I prefer, however, to dissolve the volatilized titanium compounds either as vapors or after collection in a non-alkaline aqueous liquid, such as water. An ammonium fluoride solution may be used, preferably hot, if a certain type of crystal product, as hereinafter referred to, is desired. The solution should be neutral or acid. A boiling or near-boiling ammonium fluoride solution is somewhat acid because of the dissociation of the ammonium fluoride at these temperatures. The ammonium fluoride concentration of the solution may vary widely, and may be from 16% to 50% or higher. I prefer to use a concentration of from 20% to 40% when producing the crystal product as hereinafter set forth. The diamminotetrafluoride and other volatilized compounds may either be condensed as a powder and dissolved or the vapors may be contacted directly with the fluoride solution, suitably in a spray chamber or countercurrent gas-washing tower. In addition to the titanium compounds, ammonium fluoride and any other accompanying soluble salts are dissolved. The final concentration of titanium salts in the ammonium fluoride solution which it is desirable to obtain is indicated hereinafter. The resultant liquor also retains those solids which may have been carried over mechanically from the reaction furnace in the form of dust. Iron fluoride and other heavy metal compounds which are carried over either mechanically or in vapor form are dissolved, to the extent of their slight solubility by the ammonium fluoride solution. The iron and other heavy metals must be removed quantitatively if a white titanium dioxide pigment is to be produced.

I have found that it is possible to remove substantially quantitatively the iron and other heavy metals dissolved in ammonium fluoride solutions, containing titanium tetrafluoride compounds dissolved therein by treatment with a soluble sulfide, without simultaneously precipitating the titanium. The hydrogen ion concentration of the fluoride solution of the concentration noted above must be regulated carefully. The slightly acid fluoride solution may be neutralized with ammonia to the point at which the addition of more ammonia precipitates out permanently the hydrate or a crystalline titanium compound. This point is designated as "substantially neutral" for convenience hereafter.

After this condition is attained, ammonium sulfide is a convenient soluble sulfide which may be used as the precipitant. Sodium or potassium sulfides or hydrogen sulfide are other soluble sulfides that may be used. If hydrogen sulfide is used, additional alkali is required to maintain the necessary neutrality. The iron and other heavy metals are precipitated as sulfides either in a hot or cold solution, a hot solution (about 70° C.) being preferred. The precipitate may be filtered readily from the solution together with any other insolubles that may be present. The iron sulfide is precipitated as the ferrous salt, the ammonium sulfide reducing any ferric salts to the ferrous condition. Precautions must be taken to prevent the ferrous sulfide, before it is separated from the solution, from being again oxidized to the ferric condition whereby it will again dissolve in the fluoride solution.

The titanium may be largely or completely separated from the reaction mass resulting from the treatment of the titanium-bearing material with ammonium fluoride as above described (prior to dissociation and volatilization of the titanium compounds therein) by leaching the same with a non-alkaline aqueous liquid. Thus, a solution of the nature hereinbefore described, containing the titanium diamminotetrafluoride and other titanium salts dissolved therein may be obtained. When the reaction mass formed as above described, by reaction on the titanium-bearing material with ammonium fluoride at temperatures below about 150° C. or at higher temperatures to about 290° C.–300° C., is leached with an aqueous ammonium fluoride solution (either hot or cold, neutral or slightly acid) of the concentration hereinbefore described for dissolving the volatilized titanium tetrafluoride compounds, a solution is formed which is similar in its properties and is apparently the same or equivalent in behavior to that formed when the volatilized titanium compounds are dissolved in the ammonium fluoride solution. In some instances there may be excess ammonium fluoride in the reaction mass sufficient to provide part or all of the requirement of the leaching solution and water or dilute ammonium fluoride solution may be used accordingly. This solution secured by leaching, which may also contain small amounts of dissolved iron, may then be treated for removal of iron while either hot or cold by a soluble sulfide and filtered as previously described.

The leaching process described in the preceding paragraph may be used advantageously when rutile is the titanium-bearing ore. The small amount of iron contained in rutile as an impurity leaves but a small amount of insoluble residue, thereby minimizing the leaching problems and costs.

In carrying out the decomposition reaction in the wet way it is preferred to use a larger excess of ammonium fluoride or equivalent bifluoride than in the dry way reaction (Equation 3); say, in excess of 12 molecular parts. For example, 4 parts by weight (about 16 molecular parts) of $NH_4F$ is found desirable for 1 part of ilmenite. As in the "dry way" reaction with ammonium fluoride, finer grinding of the ilmenite also increases the efficiency of the reaction as determined by the titanium dissolved. Water may be added to a mixture of ammonium fluoride and the titanium-bearing material. Preferably, the ammonium fluoride is added to the finely ground titanium oxide-bearing material in the form of a solution, preferably concentrated, and the mixture heated, preferably with stirring. As the temperature is raised the solution attacks the titanium-bearing material and a pasty mass is formed, the temperature usually reaching above 150° C. There is a vigorous evolution of ammonia and the pasty mass becomes gray in color as the reaction proceeds. Although the reaction is substantially complete at 140–150° C. in the presence of water in the reaction mass, the temperature may be increased to above 150° C.

After the reaction is complete the titanium may be volatilized by heating the mass to above 290–300° C. and preferably to about 500–550° C. to volatilize substantially all of the titanium as tetrafluoride compounds. I prefer however to leach the mass with an aqueous fluid, such as water or an aqueous solution of ammonium fluoride. The amount of excess ammonium fluoride in the reaction mass usually is sufficient so that additional ammonium fluoride is not used in the leaching water in order to provide the best conditions for precipitating the heavy metal sulfides and securing decreased iron fluoride solubility as explained hereinbefore. The reaction mass is leached with water. The dissolved titanium tetrafluoride salts, probably double fluorides, are filtered from the insoluble portion, which consists largely of ferrous ammonium fluoride if ilmenite is the titanium oxide-bearing raw material. The residue is washed with water or ammonium fluoride solution to remove the soluble titanium salts. The residue may then be heated in a retort in the presence of oxygen or air and steam to volatilize and recover the ammonium fluoride and convert the ferrous fluoride into an iron oxide and hydrofluoric acid which may be neutralized with ammonia to produce ammonium fluoride. The iron oxide so formed is a finely divided fluffy material, of value as a paint pigment.

The solution of the titanium double salt is neutralized with ammonia to the correct hydrogen ion concentration for treatment with a soluble sulfide for the removal of iron and other heavy metals, as described in the dry way process. The iron is removed as a sulfide and the titanium solution treated as described hereinafter for the production of oxide.

Rutile may be used in place of ilmenite as the raw titanium-bearing material. A larger proportion of ammonium fluoride is used and the initial reaction is preferably carried out at a slightly higher temperature, say about 140°–150° C. since rutile is less easily attacked. Since rutile contains little iron oxide the residue does not present a recovery problem as when ilmenite is used.

A solution of titanium compounds may thus be secured by solution of titanium fluoride compounds volatilized from a suitable reaction mixture, by solution from such a reaction mixture, or by direct reaction on the titanium ore in the presence of a suitable solvent. The filtered ammonium fluoride solution free from iron and other heavy metals and containing the titanium diammino-tetrafluoride or other titanium tetrafluoride compounds dissolved therein is then subjected to the action of ammonia for the precipitation and separation of the titanium. With more dilute solutions the hydrate may be produced and after its removal the solution concentrated and returned to the system. To secure a crystal product as hereinafter set forth, anhydrous ammonia may be passed into the solution, and the solution also may be cooled to obtain the optimum yield of the crystals as set forth hereinafter. The titanium may be precipitated practically quantitatively under the conditions hereinafter set forth in the form of definite octahedral crystals, often star-like in shape, which seem to have the approximate composition $TiF_4.2NH_3.NH_4F$, and apparently do not contain any water of crystallization. The crystals are removed and the mother liquor, which is an ammoniacal strong ammonium fluoride solution, is returned to the process.

The formation of the octahedral crystals by adding ammonia to the solution of the titanium fluoride compound takes place under conditions preferably controlled as to the percentage of total solids ($NH_4F+TiF_4$) in solution and as to the ratio of $NH_4F$ to $TiF_4$ in these solids. The most favorable condition for the formation of these crystals appears to be within the limiting $NH_4F$ to $TiF_4$ ratios of 2½ to 1 and 4 to 1 by weight. Within these ratios the crystals start to form at a total solids concentration of a little better than 20% or an $NH_4F$ concentration of at least about 16%, the optimum being at about the ratio of 3 to 1 by weight. If the ratio is decreased or increased a higher total solids concentration is needed to form the crystals. For example, at the ratios 1.6 to 1 and 4.8 to 1 a total solids concentration of 40% is needed to precipitate the titanium tetrafluoride compound in the form of the octahedral crystals. Below the ratio of 1 to 1 and above the ratio of 5 to 1 these crystals do not seem to form. To secure the desired ratios, ammonium fluoride may sometimes be added to the solution.

Outside of the limits necessary for producing the octahedral crystals either crystals of other types are formed, some of which are long, thin and needle-like or the hydrate is formed. The needle-like crystals are bulky and are more difficult to handle and therefore the octahedral crystals are preferred to them. The hydrate produced directly by the addition of ammonia to the solution may be used to produce a highly satisfactory pigment.

It has been found, that under the preferred favorable conditions of total solids concentration and ratios of $NH_4F$ to $TiF_4$ previously set forth, the octahedral crystals may be precipitated by the addition of ammonia water to the ammonium fluoride solution of the titanium tetrafluoride compounds, while under less favorable conditions anhydrous ammonia is needed for the precipitation. These conditions are explained by the data given above.

The titanium ammino-ammonium fluoride compound which volatilizes at about 400° C. crystallizes at times as well defined octahedra, but as a rule star-like crystals are developed by twinning. For example, a solution of the following composition gives excellent results: $TiF_4$, 11.5% (as calculated from Ti content), and the remaining F calculated as $NH_4F=27.0\%$.

The procedure for the separation of the titanium fluoride compound may be varied. For example, the hot concentrated non-alkaline ammonium fluoride solution containing the dissolved titanium (fluoride compounds) may be cooled before removing the iron and allowed to crystallize. The crystals so formed are irregularly shaped and somewhat poorly defined. They are separated from the mother liquor, dissolved in a limited amount of hot water, the hydrogen ion concentration regulated to neutrality, and a soluble sulfide added to precipitate the iron. Since the ratio of $NH_4F$ to $TiF_4$ in these crystals is below 1 to 1, ammonium fluoride must be added before treating with ammonia if the octahedral type crystals as hereinbefore described are desired.

The crystals of complex titanium salt are subjected to the action of water and ammonia to produce the hydrate. I prefer to carry out this reaction in two steps. In the preferred method the crystals are first treated with a limited measured amount of water, preferably from 1 to 2 times the weight of the dry crystals. If the water is added at one time the mixture first thickens and sets into a cheesy mass, but on further stirring, which should be more of the nature of a grinding action, the stiff pasty mass becomes more fluid. I prefer, however, to add the water slowly with constant stirring to the crystals.

About one to two parts of ammonia water are now added to the water suspension previously produced. The physical properties of the titanium oxide pigment produced are affected greatly by the method of adding the water and ammonia, the concentration of the ammonia, and the temperature. The resultant mixture is stirred, the ammonia completing the hydration of the titanium salt. The hydrate so produced filters easily and is washed with ammonia water after which it is dried. The filtrate which contains ammonia and ammonium fluoride is reused in the process.

The hydrate which is formed as described from the crystals seems to be neither ortho nor meta-titanic acid and appears to differ from products hitherto described. It may be $TiO_2(H_2O)$. It appears amorphous under X-ray. Even after drying at 110° C. to 150° C. my new product is soluble in weak HCl or weak $H_2SO_4$. The titanium oxide may then be calcined at higher temperatures up to 900°–1200° C. to impart various properties demanded by the paint industry. The pigment thus made is of extreme whiteness and has high opacity and hiding power.

In another variation of my procedure, the digested mass resulting from the action of ammonium fluoride on ilmenite or rutile is leached with hot water or hot ammonium fluoride solution. The hot leach liquor is treated to remove iron and is then cooled without the further addition of ammonia. Crystals of a double salt of titanium and ammonium fluoride are formed which are treated with ammonia water to produce the hydrate.

Although the preferred procedure with the octahedral and star-shaped crystals is to form the hydrated oxide in two steps as described, this process may be carried out, though with less satisfactory results, in one step by adding the proper concentration and amount of ammonia water to the crystals.

The hydrate, as previously noted, may be produced also directly from the ammonium fluoride solution of the titanium salt without first forming the star-shaped crystals. This may be done by diluting the solution and adding ammonia or adding the solution to ammonia water. For example, the titanium solution previously referred to containing 11.5% of $TiF_4$ and 27.0% $NH_4F$ after removal of the iron is diluted with water to 8.5% $TiF_4$ and 20.0% $NH_4F$. It is then poured into ammonia water containing 20% $NH_3$. This is about the upper limit of concentration of $NH_4F$ to $TiF_4$ (total solids) beyond which crystal formation takes place at this particular ratio of $NH_4F$ to $TiF_4$ (2.3:1) with this particular concentration of ammonia water. If stronger ammonia water is used then the concentration of solids in the titanium solution should be lower, and vice versa, if a weaker ammonia water is used a greater concentration of solids may be used. If the 20% ammonia water is poured into the titanium solution to produce the hydrate, the concentration of total solids must be decreased below the 28.5% used above, preferably below 20%. In general, it is desirable to keep the $NH_4F$ to $TiF_4$ ratio below 3:1. The hydrate so formed is washed, dried and calcined as previously described. It is particularly characterized by its high mobility. For example, a typical product formed as herein described has a mobility as determined by the mobilometer test described in Gardner's "Physical and Chemical Examination of Paints, Varnishes, Lacquers and Colors" 6th Ed., 1933) less than 10 seconds; for example, of about 4 seconds. Titanium oxide pigments as hitherto produced have much lower mobility, as indicated by mobilometer readings in general in the order of 20 seconds and higher.

A pigment with good covering power may be produced by adding ammonia directly to the dry condensed titanium diammino-tetrafluoride. The diammino-tetrafluoride must be of high purity and free from iron and heavy metals if a high grade product is to be produced by this method. The diammino-tetrafluoride is freed conveniently from iron fluoride and their impurities mechanically carried over during the initial decomposition reaction by resublimation.

By choosing as the titanium-containing material an anhydrous titanium salt, such as an alkali-metal or ammonium double sulfate, and a metallic fluoride such as sodium fluoride as the fluorine source, the vaporization of the titanium as a tetrafluoride compound may be accomplished as illustrated in Equation (5):

(5) $Na_2Ti(SO_4)_3 + 4NaF = 3Na_2SO_4 + TiF_4$

By heating ammonium-titanium sulfate with, for instance, calcium fluoride, titanium tetrafluoride is formed and vaporized together with ammonium fluoride, as illustrated in Equation (6).

(6) $(NH_4)_2Ti(SO_4)_3 + 3CaF_2 =$
$3CaSO_4 + TiF_4 + 2NH_4F$

If an alkali-metal double sulfate is used in the reaction as in Equation (5), ammonium fluoride preferably is added to act as an intermediary between the metallic compounds to facilitate the reaction. A double fluoride compound of titanium and ammonium is apparently primarily formed. Since titanium tetrafluoride condenses to a liquid and is corrosive to metals it is desirable to form the non-corrosive diammino compound which condenses to a solid by carrying out reactions (5) and (6) in the presence of ammonia gas.

The temperature at which the reactions (5) and (6) take place is below the dissociation temperature of the titanium sulfate compound, and preferably below about 400° C.

The present principal available sources of titanium oxide are ilmenite and rutile. Rutile is less reactive than ilmenite and requires a higher degree of pulverization. Preheating to above 140° C. with sudden cooling increases its reactivity.

The accompanying drawings are flow sheets diagrammatically illustrating several embodiments of the invention.

The following are specific examples of methods for carrying out my invention. However, it is understood that my invention is not limited to specific details thereof.

The handling of the reaction mixture in the heating or furnacing operation may be varied in accordance with the material treated and the type of furnace used.

Thus, 100 kilos of finely pulverized ilmenite, containing 52% $TiO_2$ and 44% FeO (the iron present being calculated as FeO) may be intimately mixed, suitably by means of an edge runner, with 300 kilos of centrifuged ammonium fluoride crystals, usually containing about 4% of moisture.

The mixture is fed over a period of time (20 to 60 minutes) into an enclosed, externally-heated furnace with suitable stirring mechanism, feeding devices and outlets for discharge of the vapors and residue. The temperature of the material in the furnace is maintained at about 110°–150° C. In some cases, it may be desirable to maintain a temperature of 150° C., and at times it may be found desirable to go to somewhat higher temperatures. The selected temperature is maintained during the initial reaction period in which the metallic oxides react with the ammonium fluoride, forming metallic fluorides, and ammonia and water are formed and escape in gaseous form from the furnace. The time of reaction varies with the depth of the charge in the furnace, a layer 6 inches deep requiring about 3 hours. The reaction is complete when no more ammonia is evolved.

The ammonia is collected, suitably by absorption in water, or it may be used for other reactions as hereinbefore described.

If a muffle type furnace is employed, the mixture of ilmenite and ammonium fluoride, in the same proportions, after being intimately admixed, may be compressed in layers, say about 2½ inches thick, in pans which are placed in the furnace, provided with the necessary vapor outlets.

Rutile or mixtures of rutile and ilmenite may be handled in a similar manner and in similar proportions, the rutile being preferably subjected to a preliminary calcining operation.

For example, 100 kilos of finely ground rutile are intimately admixed with 450 kilos of ammonium fluoride in an edge runner, charged into the furnace, and heated to a temperature of 150° to 170° C. until no more ammonia is evolved. The rutile may be preliminarily heated, if desired.

If desired, the charge of titanium-containing material may be fed to the furnace with only a part of the ammonium fluoride, the remainder being supplied later. Thus, a finely ground mixture of 50 kilos of rutile with 50 kilos of ilmenite is mixed with 120 kilos of ammonium fluoride and heated at about 170° C. If desired, 25 kilos of inert material, such as fluorspar or the iron fluoride residue obtained as hereinafter described, is mixed with the charge to prevent caking. After an hours heating, another 120 kilos of ammonium fluoride is fed into the furnace, and another 120 kilos after two hours of heating. The charge is maintained at the initial temperature until the reaction is complete and no more ammonia is evolved. After the completion of the reaction by the methods and with the mixtures as set forth above the temperature of the reaction mass is raised to about 250° C., vapors of ammonium fluoride being evolved. The reaction mass is kept at this temperature for a suitable period, say, about an hour. These vapors evolved preferably are collected separately from the ammonia vapors previously evolved. If silicon diamminotetrafluoride is evolved this also is collected. For removal of titanium compounds by volatilization the temperature is now raised above 300° C. the final temperature being about 500° to 550° C. There is a heavy evolution of vapors, principally titanium-diammino-tetrafluoride and some ammonium fluoride during the earlier stages. As the temperature is raised, the total time of heating being, suitably in the case described, 3 to 5 hours, the volume of vapors decreases, the final reaction mixture, after completion of the initial reaction as indicated by the cessation of the evolution of ammonia, may be rapidly heated to 500° to 550° C., with evolution of vapors of ammonium fluoride, diamminofluoride and titanofluoride as hereinbefore referred to.

The vapors evolved may be collected and treated by passing them into a spray tower in which a hot (near boiling) 20%–40% ammonium fluoride solution is circulated and in which the ammonium fluoride ($NH_4F$), titanium fluoride ($TiF_4$) ratio is kept between 2.5 to 1 and 4 to 1. To do this, portions of the circulating liquor of the desired concentration are drawn off from time to time and replaced by less concentrated $NH_4F$ solution. The hot liquor which is removed is neutralized with ammonia and ammonium sulfide added, whereby the iron and heavy metals in the solution are precipitated. The precipitated iron sulfide and other insolubles are filtered from the hot solution, which should be substantially free from iron and heavy metals if a white titanium oxide pigment is to be produced therefrom. The purified, filtered solution is then treated with ammonia gas. Octahedral crystals, many of which are star-like in form, are formed and separate from the solution. Substantially the entire titanium content of the solution separates therefrom in these crystals, especially if the solution is cooled to room temperature. The mother liquor is removed from the separated crystals and contains ammonium fluoride which may be recovered for treating further quantities of ore or the solution may be returned to the spray tower after first removing the ammonia.

The crystals, which are of the approximate composition $TiF_4.2NH_3.NH_4F$, are filtered or centrifuged to remove adhering mother liquor and are then hydrolyzed by the addition of 1 to 2 parts of water in small portions while simultaneously subjecting the crystals to a grinding action. The hydrolyzed product has the consistency of a thickened liquid.

One to two parts of strong ammonia water are added to hydrate the hydrolyzed product. The precipitate is dense and the fluid suspension which results from the action of the ammonia filters readily. Ammonia water is used to wash the hydrate on the filter to remove ammonium fluoride. The ammonia and ammonium fluoride in the filtrate are reused in the process.

The filter cake of hydrated titanium oxide containing ammonia water is dried and calcined at a temperature about 900° C. to 1100° C. The titanium oxide produced thereby makes an excellent pigment, and has the characteristics hereinbefore set forth.

The iron fluoride residue in the furnace after volatilization of the titanium tetrafluoride compounds therefrom may be treated by passing moist air over it while it is maintained at substantially the same temperature as is used during the volatilization of the titanium compounds. The hydrofluoric acid which is evolved is collected suitably in ammonia water, thereby regenerating ammonium fluoride. The iron oxide formed may be used as a pigment.

The vapors containing titanium tetrafluoride compound secured on heating the reaction mixture of titanium ore and ammonium fluoride at and above 300° C. after completion of the initial reaction, instead of being treated with water to dissolve the vaporized compound, as previously described, may be collected and treated by passing into a spray tower in which is used or circulated an ammoniacal aqueous liquor, preferably containing ammonium fluoride in solution. If desired all of the vapors evolved from the reaction mixture may be collected and treated in a similar way. If the concentration of fluoride is not too high as hereinbefore described, the titanium is precipitated as the hydrate. The ammoniacal liquor containing the titanium hydrate is cooled to below 34° C. to effect complete precipitation and preferably below 10° C. to increase the density of the precipitated hydrate. The density of the titania is higher with increased fluoride content of the circulating liquor. The hydrate is filtered out of the liquor and after the maximum concentration of ammonium fluoride has been reached, a part of the liquor from the scrubber may be removed and filtered, while the remainder of the liquor is recirculated with the addition of the wash water from the titania precipitate to make up the loss in volume. The ammonia and ammonium fluoride contained in the withdrawn liquor are recovered for further use in the process.

The density of the recovered titanium hydrate may be further increased by mechanical manipulation, for instance, by treatment of the filter cake in a ball mill. The recovered hydrate is dried and calcined as above described.

In the preceding specific procedures, the removal of titanium compounds from the reaction mass has been effected by volatilization. They may also be removed by leaching or solution, as has been hereinbefore set forth. The reaction is initiated as set forth above in connection with specific reaction mixtures and is carried to completion of the reaction in which ammonia is evolved, which may be at 150°–170° C. The reaction mixture may then be subjected to the leaching operation hereinafter described, or it may be heated to a higher temperature, up to 250° C. as described above to effect removal of ammonium fluoride before subjecting it to the leaching operation; or it may be carried to a higher temperature of 230° to 290° C. to also effect removal of silica as silicon diamminotetrafluoride before being subjected to the leaching operation.

In the leaching operation the charge is removed from the furnace, for example, after volatilization of ammonium fluoride, or at a later selected stage of reaction, and leached with 110 gallons of 35% ammonium fluoride solution for each 100 kilos of ore, the solution being either cold or moderately heated, say to 65° C., preferably using countercurrent circulation. The strong ammonium fluoride solution is used to minimize the solution of the iron fluoride. Weaker solutions may be used, if desired, or if the reaction mass is leached before the temperature is raised to effect volatilization of ammonium fluoride. The slurry is filtered and the filtrate treated to remove the iron and precipitate the titania as herein described.

When the titanium-containing material is rutile alone, the small amount of residue remaining after volatilization of the titanium compounds or after the leaching operation may be again reacted with ammonium fluoride and leached in the same way.

The reaction residues may also be treated as follows:

The residue remaining after leaching or the hot iron fluoride residue in the furnace after volatilization of the titanium tetrafluoride compounds therefrom is treated by adding ammonium sulfate thereto, and decomposed. Approximately 0.8 part by weight of ammonium sulfate for 1 part by weight of the original ore may be added. The temperature during the decomposition of the residue is preferably kept at about 300–350° C. Ammonium fluoride passes off and iron sulfate is formed together with sulfates of metals occurring as impurities in the ore and remaining unvolatilized or undissolved in the reaction residues.

The furnace residue, consisting almost entirely of ferrous sulfate, is roasted at a temperature of above about 500° C. and sulfuric acid regenerated in a way known to the art. This acid may be combined with ammonia produced in the preceding operations to form ammonium sulfate, which may be employed in a further dissociation of fluoride residue. The iron is recovered as iron oxide.

The ammonium sulfate used in the operation also may be regenerated by reacting ammonia, evolved during treatment of the ore or produced during other stages of the process, with iron sulfate, crystallized or in solution, derived from the residue.

If desired the residue may be leached for the production of ferrous sulfate, (copperas) instead of roasting it as above set forth.

If the titaniferous material contains silica, a complete separation is secured when the ammonium fluoride is volatilized from the reaction mass at temperatures below 300° C. The mixed ammonium fluoride and silicon diamminotetrafluoride vapors are treated or washed in any suitable device or scrubber with water or with a solution of ammonium fluoride as above described, which has not been made ammoniacal. I have named the silica which is thereby precipitated, "alpha silica". This silica is filtered off and the filtrate, containing the ammonium fluoride and ammonium silicofluoride resulting from the reaction between water and the silicon diamminotetrafluoride is then treated with ammonia. By keeping the temperature low (below 34° C. and preferably below 10° C.) during this treatment with ammonia and keeping the solution concentrated a dense, opaque, silica, which I have named "beta" silica, is precipitated. The "alpha" is translucent and has a high oil absorption and it is therefore desirable to conduct the operation in two steps as described. The "beta" silica may be used to produce a silica-titania pigment of high tinting strength and hiding power, the silica acting as an extender though it has considerable covering power in itself.

If desired, the mixture of ammonium fluoride and silicon tetrafluoride vapors, produced as above described, are mixed with the titanium diamminotetrafluoride vapors produced by heating a reaction mixture at higher temperatures, as previously set forth. This mixture is contacted with a concentrated ammonium fluoride solution in the same manner as previously described in connection with the volatilized titanium fluoride compounds. The "alpha" silica produced thereby may be filtered from the solution prior to the removal of the iron as a sulfide as described or it may be removed by the filtering operation used to remove the iron. The presence of the "alpha" silica is desirable because it helps to clarify the solution. The ammonium silicofluoride remaining in solution subsequently reacts with the ammonia which is added to the filtrate to thereby form the "beta" silica. The titania is precipitated with this silica. Such a solution of titanium tetrafluoride compounds and ammonium silicofluoride is produced when the reaction mass is leached with ammonium fluoride solution, when silica is present with the ore used and the reaction mass is not heated to effect its separate removal.

The mixtures of titanium diamminotetrafluoride and silicon diamminotetrafluoride, for treatment as just described, may be secured either by mixing the vapors and condensing the mixture, or by condensing the vapors of these products separately as driven off in the reaction and then mixing preferably after resublimation; or the ammonium silicofluoride produced separately may be dissolved in the solution of complex titanium fluoride compounds in ammonium fluoride solution after removal from the latter of the iron as sulphide, further water being added if necessary.

If desired, mixed titanium and silicon amminotetrafluoride vapors may be driven off from the reaction mixture by proper control of the temperature and, after removing dust mechanically carried over, contacted with ammoniacal liquor or ammoniacal ammonium fluoride solution as described above in connection with the titanium vapors, to thereby completely precipitate the titanium and silicon as a mixture of titania and the "alpha" and "beta" silicas previously described. This mixture is then filtered from the solution, washed and dried. It is calcined if a paint pigment is to be produced.

To secure a pigment product, ammonium silicofluoride produced separately may be mixed with calcined titanium dioxide as produced as hereinbefore described, for example, in the proportion of 9 parts by weight of $(NH_4)_2SiF_6$ to 1 part by weight of $TiO_2$. The ammonium silicofluoride may be in the form of crystals or in solution. The "beta" silica is then precipitated by adding ammonia. The precipitate is filtered, washed and calcined at 350° C. or at a higher temperature. The resultant pigment has a high tinting strength and makes a paint which produces a smooth glossy finish on drying. Instead of precipitating the "beta" silica onto the titanium dioxide, the silica may be precipitated first and then mixed with the titanium dioxide.

In one of the preceding specific examples, in connection with the treatment of a reaction residue, the addition of a mixture of fluorspar and ammonium sulfate has been described to produce ammonium fluoride needed to make up deficiencies of that material. It is readily apparent that in any of the various modifications of the process, a similar addition may be made for the same purpose to the reaction mixture before treatment, or to reaction residues which are to be subjected to further heating.

The following examples illustrate operations in accordance with the invention in which water is present during the initial reaction involving the titanium-containing mixture:

100 kilos of finely ground ilmenite are mixed with 400 kilos of ammonium fluoride, the latter being dissolved to form a strong water solution. This mixture is introduced into a closed reaction vessel provided with a stirrer and the mass heated with stirring. The temperature is raised to 110°–180° C. and kept at the latter temperature with stirring until the reaction is complete, the ammonia, ammonium fluoride and water vapor formed by the reaction being vented from the vessel. The reaction mass is digested with hot water, the insoluble ferrous fluoride then being filtered hot from the leach liquor. The solution of ammonium-titanium-tetrafluoride compound is then neutralized with ammonia and the iron removed with ammonium sulfide while the solution is hot as in the case of the ammonium fluoride solution of the complex titaniumfluoride compound previously described. The resulting solution may be further treated for the formation of the complex titanium ammonium fluoride crystals or the hydrate as hereinbefore set forth. It is preferred, however, to introduce the iron-free solution, after dilution with water, into ammonia water to precipitate the hydrate. If the ammonia is poured into the solution, some of the crystalline complex titanium-ammonium fluoride compound may form. The hydrate is filtered, washed free of salts, and calcined at 900° C. The titanium oxide which results has the characteristics of high mobility, previously set forth.

The iron double fluoride residue is heated in the presence of steam in a closed furnace to 400°–550° C. The volatilized ammonium bifluoride formed is condensed and the residual iron oxide which is formed may be used for pigment or abrasive purposes. This makes a black pigment. If a red pigment is desired the double fluoride is first decomposed at 400–450° C. whereby the ammonium fluoride is volatilized, leaving the ferrous fluoride, which is then treated at 500°–550° C. with moist air.

When rutile is used as the titanium-containing material in the operation last described, 100 kilos of finely ground rutile are mixed with 500 kilos of ammonium fluoride as a strong water solution thereof. The mixture is introduced into the reaction vessel and heated at about 140°–180° C. until the reaction is completed. The reaction mass is leached, filtered, and the solution of titanium tetrafluoride salts treated as in the operation described, using ilmenite.

The terms "volatile" and "non-volatile" are herein used to designate those properties at the temperatures involved.

In this application I make no distinction between ammonium fluoride and ammonium bifluoride in their chemical reaction with the titanium oxygen compounds. However, physically the two compounds differ, the bifluoride melting and causing furnace difficulties not encountered with the normal salt. Likewise the bisulphate of ammonia may be used in place of the normal sulfate.

In the various reactions ammonia and ammonium fluoride are produced and consumed. It is understood that the process is cyclic with reference to these two materials, that is, when they are produced as a result of a reaction they are recovered and used again in the process. It is necessary to make up for mechanical losses of these materials from time to time. In certain reactions ammonium sulfate is the reactive material. The process with reference to this salt also is cyclic.

In using the term ammonium-titanium-fluoride compounds herein, I include thereunder both amino and ammonium compounds of the character hereinbefore set forth.

Where a non-alkaline solution is referred to in the claims this refers to solutions in which the alkalinity is insufficient to precipitate the titanium as hydrate or crystals of the titanium amminotetrafluoride compound hereinbefore described. A neutral solution of the titanium tetrafluoride compound is one in which the addition of small amounts of ammonia will cause the precipitation of titanium hydrate or crystals of the titanium amminotetrafluoride compound.

I claim:

1. In the production of titanium products from titanium-bearing materials, forming an ammonium-titanium fluoride compound and effecting solution thereof in a non-alkaline solution of ammonium fluoride.

2. In the production of titanium products from titaninum-bearing materials, forming an ammonium-titanium fluoride compound and effecting solution thereof in a non-alkaline solution of ammonium fluoride, the ammonium fluoride in such solution being in such amounts as to provide a ratio of $NH_4F$ to $TiF_4$ of from 1:1 to 5:1 by weight.

3. In the production of titanium products from titanium-bearing materials, forming an ammonium-titanium fluoride compound and effecting solution thereof in a non-alkaline solution of ammonium fluoride, the ammonium fluoride in such solution being in such amounts as to provide a ratio of $NH_4F$ to $TiF_4$ of from 2.5:1 to 4:1 by weight.

4. In the production of titanium products from titanium-bearing materials, effecting solution of an ammonium-titanium-fluoride compound in a non-alkaline solution containing ammonium fluoride, and mixing ammonia therewith, in quantity to effect precipitation of titanium compounds therefrom.

5. In the production of titanium products from titanium-bearing materials, effecting solution of an ammonium-titanium fluoride compound in a non-alkaline solution containing ammonium fluoride, ammonium fluoride being supplied in said solution to provide a ratio of $NH_4F$ to $TiF_4$ of from 1:1 to 5:1 by weight with a total solid content above about 20% and mixing ammonia therewith, thereby precipitating a crystalline ammonium - ammino - titanium - fluoride therefrom.

6. In the production of titanium products from titanium-bearing materials, effecting solution of an ammonium-titanium-fluoride compound in a non-alkaline solution containing ammonium fluoride, ammonium fluoride being supplied in said solution to provide a ratio of $NH_4F$ to $TiF_4$ of from 2.5:1 to 4:1 by weight with a total solid content above about 20% and mixing ammonia therewith, thereby precipitating a crystalline ammonium - ammino - titanium - fluoride therefrom.

7. In the production of titanium products from titanium-bearing materials, effecting solution of an ammonium-titanium-fluoride compound in a non-alkaline solution containing ammonium fluoride and mixing ammonia therewith, the proportion of ammonium fluoride and of solids therein being controlled to effect precipitation of titanium hydrate.

8. In the production of titanium products from titanium-bearing materials, effecting solution of an ammonium-titanium-fluoride compound in a non-alkaline solution containing ammonium fluoride being supplied in said solution in a proportion to provide a ratio of $NH_4F$ to $TiF_4$ of below 3:1 by weight and adding said solution to ammonia water, thereby precipitating a titanium hydrate.

9. In the production of titanium products from titanium-bearing materials, whereby an ammonium-titanium-fluoride compound is formed and solution thereof is effected in non-alkaline solution of ammonium fluoride in such concentrations that a crystalline compound is formed upon the addition of ammonia to a neutral solution thereof, the method of precipitating a titanium hydrate from said ammonium-titanium-fluoride solution which comprises mixing ammonia therewith so that an excess of ammonia is present at the moment reaction occurs between the titanium salt and ammonia.

10. In the production of titanium products from titanium-bearing materials, whereby an ammonium - titanium - fluoride compound is formed and solution thereof is effected in non-alkaline solution of ammonium fluoride in such concentrations that a crystalline compound is formed upon the addition of ammonia to a neutral solution thereof, the method of precipitating a titanium hydrate from said ammonium-titanium-fluoride solution which comprises adding the solution of titanium salt to ammonium hydrate in excess.

11. In the treatment and purification of titanium compounds, effecting solution of a titanium fluoride compound in a non-alkaline aqueous liquid containing ammonium fluoride, neutralizing said solution and adding a soluble sulphide thereto, thereby precipitating dissolved heavy metals therefrom.

12. In the treatment and purification of titanium compounds, effecting solution of titanium fluoride compounds in a non-alkaline aqueous liquid, supplying ammonium fluoride therein, adding ammonia to said solution to bring it to a substantially neutral state and adding a soluble sulfide thereto, thereby precipitating dissolved heavy metals therefrom.

13. In the treatment and purification of titanium compounds, effecting solution of titanium fluoride compounds in a non-alkaline aqueous liquid, supplying ammonium fluoride therein to provide therein a ratio of $NH_4F$ to $TiF_4$ of from 1:1 to 5:1 by weight, adding ammonia to said solution to bring it to a substantially neutral state and adding ammonium sulfide thereto, thereby precipitating dissolved heavy metals therefrom.

14. In the treatment and purification of titanium compounds, effecting solution of titanium fluoride compounds in a non-alkaline aqueous liquid, supplying ammonium fluoride therein to provide therein a ratio of $NH_4F:TiF_4$ of from 1:1 to 5:1 by weight and maintaining the total combined proportion of said fluorides in said solution above about 20%, adding ammonia to said solution to bring it to a substantially neutral state and adding ammonium sulfide thereto, thereby precipitating dissolved heavy metals therefrom.

15. In the preparation of purified titanium compounds, adding a soluble sulfide to a substantially neutral aqueous solution of ammonium and titanium fluorides, thereby precipitating dissolved iron therefrom, and subsequently mixing ammonia with said solution, thereby precipitating substantially iron-free titanium compounds therefrom.

16. In the preparation of purified titanium compounds, adding a soluble sulfide to a substantially neutral aqueous solution of ammonium and titanium fluorides, thereby precipitating dissolved iron therefrom, and subsequently mixing ammonia with said solution, the conditions thereof being controlled to effect precipitation of substantially iron-free titanium hydrate therefrom.

17. In the preparation of purified titanium compounds, adding ammonium sulfide to a substantially neutral aqueous solution of ammonium and titanium fluorides wherein the ratio of $NH_4F$ to TiF₄ is from 1:1 to 5:1 by weight, thereby precipitating dissolved iron therefrom, and subsequently adding ammonia to the solution, thereby precipitating a substantially iron-free crystalline ammonia-titanium-fluoride compound therefrom.

18. In the preparation of purified titanium compounds, effecting solution of titanium fluoride compounds in an aqueous liquid, supplying ammonium fluoride therein, adding ammonia to the solution to bring it to substantial neutrality, adding a soluble sulfide to said solution to precipitate dissolved iron therefrom, and subsequently mixing ammonia with said solution to precipitate iron-free titanium compounds therefrom.

19. In the preparation of purified titanium compounds, effecting solution of titanium fluoride compounds in an aqueous liquid, supplying ammonium fluoride therein, adding ammonia to the solution to bring it to substantial neutrality, adding a soluble sulfide to said solution to precipitate dissolved iron therefrom, and subsequently mixing ammonia with said solution under conditions to precipitate iron-free titanium hydrate therefrom.

20. In the preparation of purified titanium compounds, effecting solution of titanium fluoride compounds in an aqueous liquid, supplying ammonium fluoride therein to provide therein a ratio of NH₄F to TiF₄ of from 1:1 to 5:1 by weight, adding ammonia to the solution to bring it to substantial neutrality, adding ammonium sulfide to said solution to precipitate dissolved iron therefrom, and subsequently adding ammonia to said solution to precipitate iron-free crystalline ammonium-ammino-titanium fluoride compounds therefrom.

21. In the production of titanium products from titanium-bearing materials, effecting solution of an ammonium-titanium-fluoride compound in a non-alkaline solution containing ammonium fluoride, neutralizing said solution, removing iron from said solution and adding ammonia to the purified solution to precipitate titanium hydrate under such conditions that excess ammonia is present throughout said precipitation reaction.

22. In the production of titanium products from titanium-bearing materials, effecting solution of an ammonium-titanium-fluoride compound in a non-alkaline solution containing ammonium fluoride, neutralizing said solution and adding a soluble sulphide thereto, removing the insolubles and adding ammonia to the purified solution to precipitate the hydrate under such conditions that excess ammonia is present throughout said precipitation reaction.

23. The method of producing a hydrated titanium compound which comprises subjecting an ammonium fluoride-titanium-ammino-tetrafluoride compound to the action of water and ammonia.

24. The method of producing a hydrated titanium compound which comprises subjecting an ammonium fluoride-titanium-ammino-tetrafluoride compound to the action of water and subsequently adding ammonia thereto.

25. The method of producing a hydrated titanium compound which comprises subjecting ammonium fluoride-titanium-ammino-tetrafluoride crystals to the action of water and ammonia.

26. The method of producing a hydrated titanium compound which comprises mixing crystalline ammonium fluoride-titanium-ammino-tetrafluoride with 1 to 2 parts by weight of water, stirring the mixture whereby the liquidity of the mixture is increased and adding ammonia thereto.

27. In the production of a hydrated titanium oxide, effecting solution of titanium-fluorine compounds in a non-alkaline aqueous liquid, supplying ammonium fluoride therein, adding ammonia to the solution to effect precipitation of a complex ammonium-ammino-titanium fluoride compound, and treating said compound with water and ammonia.

28. In the production of a hydrated titanium oxide, effecting solution of titanium-fluorine compounds in a non-alkaline aqueous solution of ammonium fluoride, adding ammonia to the solution to effect precipitation of a complex ammonium-ammino-titanium fluoride compound, and treating said compound with water and ammonia.

29. The method of producing a hydrated titanium oxide which comprises subjecting a titanium oxide-bearing material to the action of ammonium fluoride to form ammonium-titanium-fluoride compounds and effecting solution thereof in a non-alkaline aqueous liquid, ammonium fluoride being supplied in the mixture in excess, separating the resulting solution, adding ammonia thereto to effect precipitation of a complex ammonium-ammino-titanium fluoride compound, and treating said compound with water and ammonia.

30. The method of producing a hydrated titanium oxide which comprises subjecting a titanium oxide-bearing material to the action of a reactive fluoride to form a titanium tetrafluoride compound, dissolving said compound in water in the presence of ammonium fluoride, precipitating iron from said solution, and reacting upon said solution with an alkali under such conditions that titanium hydrate is precipitated.

31. The method of producing a hydrated titanium oxide which comprises subjecting a titanium oxide-bearing material to the action of a solution of ammonium fluoride containing an excess of ammonium fluoride at an elevated temperature, dissolving the soluble constituents of the reaction mass in water to form a non-alkaline solution of a soluble ammonium titanium compound and ammonium fluoride, removing iron from said solution and reacting upon said solution with ammonia under such conditions that titanium hydrate is precipitated.

32. The method of producing a solution of a compound of titanium free from heavy metals, such as iron, which comprises subjecting a titanium oxide-bearing material to the action of a solution of ammonium fluoride containing an excess of ammonium fluoride at an elevated temperature, dissolving the soluble constituents of the reaction mixture, adjusting the solution to substantial neutrality, adding a soluble sulfide to said solution and removing precipitated heavy metal sulfide.

33. The method of producing a titanium hydrate free from heavy metals, such as iron, which comprises subjecting a titanium oxide-bearing material to the action of a solution of ammonium fluoride containing an excess of ammonium fluoride at an elevated temperature, dissolving the soluble constituents of the reaction mixture, adjusting the solution to substantial neutrality, adding a soluble sulfide to said solution and removing precipitated heavy metal sulfide, diluting and reacting upon said solution with an alkali under such conditions that titanium hydrate is precipitated.

34. The method for producing an iron-free solution of a compound of titanium from a titanium oxide compound containing a heavy metal, such as iron, as an impurity, which comprises mixing said compound with ammonium fluoride, heating said mixture to volatilize titanium tetrafluoride compounds therefrom, contacting said volatilized titanium compounds and accompanying impurities with ammonium fluoride solution, adjusting the solution to substantial neutrality, adding a soluble sulfide to said solution and filtering off therefrom any insoluble sulphide formed.

35. The method for producing an iron-free solution of a compound of titanium from a titanium oxide ore containing ilmenite, which comprises mixing said compound with an excess of ammonium fluoride, heating said mixture to volatilize titanium tetrafluoride compounds therefrom, contacting the volatile titanium compounds and accompanying impurities with a hot strong ammonium fluoride solution, regulating the hydrogen ion concentration of said solution, adding ammonium sulphide to said solution while hot, and filtering off the insoluble portion.

36. The method for producing an iron-free solution of a titanium compound from a titanium oxide ore containing iron, which comprises mixing said ore with an excess of ammonium fluoride, heating said mixture at a temperature below 300° C., leaching the resultant mass with water, adjusting the hydrogen ion concentration to substantial neutrality, precipitating the soluble iron in said solution with a soluble sulphide, and removing the insolubles from said solution.

37. In the production of titanium products, the method for forming a volatile titanium compound from an oxygen compound thereof and separating said volatile compound from any non-volatile portion, which comprises mixing ammonium fluoride with said compound and heating said mixture in successive stages including an earlier stage being below the temperature at which any substantial volatilization of ammonium fluoride occurs and at a temperature high enough to effect the reaction between said titanium oxygen compound and said ammonium fluoride, and a later stage being above said first temperature range.

38. The method of claim 37 in which the titanium oxygen compound is ilmenite and the upper temperature limit of said earlier heating stage is about 150° C.

39. In the production of titanium products, subjecting a titanium oxide-bearing material to the action of ammonium fluoride under reacting conditions and effecting solution of the resulting titanium fluoride compounds in a non-alkaline aqueous liquid, providing in the resulting solution an excess of ammonium fluoride.

40. In the production of titanium products, subjecting a titanium oxide-bearing material to the action of ammonium fluoride under reacting conditions and effecting solution of the resulting titanium fluoride compounds in a non-alkaline aqueous liquid, providing in the resulting solution an excess of ammonium fluoride to give a ratio of $NH_4F$ to $TiF_4$ therein of from 1:1 to 5:1 by weight.

41. In the production of titanium products, subjecting a titanium oxide-bearing material to the action of an excess of ammonium fluoride under reacting conditions, and effecting solution of the resulting titanium fluoride compounds in a non-alkaline aqueous liquid, the excess of ammonium fluoride being controlled to give a ratio of $NH_4F$ to $TiF_4$ in said solution of from 1:1 to 5:1 by weight.

42. In the production of titanium products, subjecting a titanium oxide-bearing material to the action of an excess of ammonium fluoride under reacting conditions, and effecting solution of the resulting titanium fluoride compounds in a non-alkaline aqueous liquid, the excess of ammonium fluoride and the liquid being controlled to provide at least 16% of ammonium fluoride in the resulting solution.

43. In the production of titanium products, mixing the pulverized titanium oxide-bearing material with a substantial excess of ammonium fluoride in the presence of water sufficient to dissolve at least a part of said ammonium fluoride, heating said mixture to drive off a substantial portion of said water and until the titanium oxide has reacted in large part with said fluoride.

44. The method for producing a substantially iron-free hydrate of titanium from an ilmenite ore of titanium, which comprises treating said ore with ammonium fluoride at elevated temperatures, the conditions of reaction and the amount of ammonium fluoride used being such that substantially all of the titanium present in said ore is converted into a water soluble fluoride salt and substantially all of the iron present in said ore is converted into a double fluoride salt of iron and ammonium substantially insoluble in water, said reaction being carried out at a temperature low enough to prevent volatilization of said titanium fluoride compounds, leaching the reaction product with water, removing iron impurity remaining in said leach liquor and reacting said leach liquor with ammonium under such conditions that a hydrate is produced.

45. The cyclical process for treating titanium-bearing ores containing substantial quantities of iron which comprises heating said ore with ammonium fluoride in the presence of water and continuing such heating until the reaction is completed without appreciable volatilization of the fluoride formed by the reaction, leaching the resulting reaction product with water, treating the soluble portion with ammonia formed in the initial reaction under such conditions that titanium hydrate is formed, separating the residual liquor containing ammonium fluoride from said hydrate, heating the residue from the first leaching operation and containing iron ammonium fluoride to a temperature sufficient to volatilize ammonium fluoride from said double fluoride, heating the residual iron fluoride with steam and air at elevated temperatures to form iron oxide and hydrofluoric acid, contacting said hydrofluoric acid with ammonia formed in said initial reaction to thereby form ammonium fluoride, and treating further quantities of ore with said recovered ammonium fluoride.

SVEND S. SVENDSEN.